United States Patent
Kunkel et al.

(10) Patent No.: US 9,373,361 B2
(45) Date of Patent: Jun. 21, 2016

(54) ASPERITY AND HEAD-MEDIA CONTACT DETECTION USING MULTI-STAGE TEMPERATURE COEFFICIENT OF RESISTANCE SENSOR

(71) Applicant: Seagate Technology LLC, Cupertino, CA (US)

(72) Inventors: Gary Joseph Kunkel, Minneapolis, MN (US); John L. Brand, Burnsville, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/827,584

(22) Filed: Aug. 17, 2015

(65) Prior Publication Data

US 2015/0380021 A1  Dec. 31, 2015

Related U.S. Application Data

(63) Continuation of application No. 14/287,412, filed on May 27, 2014, now Pat. No. 9,111,572, which is a continuation of application No. 13/299,082, filed on Nov. 17, 2011, now Pat. No. 8,760,811.

(60) Provisional application No. 61/414,733, filed on Nov. 17, 2010, provisional application No. 61/414,734, filed on Nov. 17, 2010.

(51) Int. Cl.
| | |
|---|---|
| *G11B 27/36* | (2006.01) |
| *G11B 5/31* | (2006.01) |
| *G11B 5/60* | (2006.01) |

(Continued)

(52) U.S. Cl.
CPC .............. *G11B 27/36* (2013.01); *G11B 5/3133* (2013.01); *G11B 5/607* (2013.01); *G11B 5/6076* (2013.01); *G11B 7/0948* (2013.01); *G11B 7/121* (2013.01)

(58) Field of Classification Search
None
See application file for complete search history.

(56) References Cited

U.S. PATENT DOCUMENTS

| | | | |
|---|---|---|---|
| 5,025,341 | A | 6/1991 | Bousquet et al. |
| 5,080,495 | A | 1/1992 | Hashimoto et al. |
| 5,561,896 | A | 10/1996 | Voegeli et al. |

(Continued)

FOREIGN PATENT DOCUMENTS

| | | |
|---|---|---|
| EP | 0752700 | 1/1997 |
| EP | 1850333 | 10/2007 |

(Continued)

OTHER PUBLICATIONS

File History for U.S. Appl. No. 13/299,082.

(Continued)

*Primary Examiner* — Carlos E Garcia
(74) *Attorney, Agent, or Firm* — Hollingsworth Davis, LLC

(57) ABSTRACT

A multi-stage sensor is situated on the head transducer and configured to interact with a magnetic recording medium. A first sensor stage of the multi-stage sensor has a temperature coefficient of resistance. A second sensor stage of the multi-stage sensor is coupled to the first sensor and has a temperature coefficient of resistance. The first sensor stage is configured to preferentially sense asperities of the media relative to the second sensor stage, and the second sensor stage configured to preferentially sense proximity to, and contact with, a surface of the media relative to the first sensor stage. The first and second sensor stages may be connected in series or in parallel.

17 Claims, 10 Drawing Sheets

(51) Int. Cl.
  *G11B 7/09*  (2006.01)
  *G11B 7/121*  (2012.01)

(56)  References Cited

U.S. PATENT DOCUMENTS

| | | | |
|---|---|---|---|
| 5,576,745 A | 11/1996 | Matsubara | |
| 5,646,805 A | 7/1997 | Shen et al. | |
| 5,689,292 A | 11/1997 | Suzuki et al. | |
| 5,691,867 A | 11/1997 | Onuma et al. | |
| 5,792,569 A | 8/1998 | Sun et al. | |
| 5,901,001 A | 5/1999 | Meyer | |
| 5,991,113 A | 11/1999 | Meyer et al. | |
| 6,019,503 A | 2/2000 | Abraham et al. | |
| 6,024,430 A | 2/2000 | Koitabashi et al. | |
| 6,052,243 A | 4/2000 | Shimada | |
| 6,052,249 A | 4/2000 | Abraham | |
| 6,071,007 A * | 6/2000 | Schaenzer et al. | 374/7 |
| 6,125,008 A | 9/2000 | Berg | |
| 6,178,157 B1 | 1/2001 | Berg | |
| 6,181,520 B1 | 1/2001 | Fukuda | |
| 6,262,572 B1 | 7/2001 | Franco et al. | |
| 6,262,858 B1 | 7/2001 | Sugiyama et al. | |
| 6,265,869 B1 | 7/2001 | Takahashi | |
| 6,311,551 B1 * | 11/2001 | Boutaghou | 73/105 |
| 6,333,836 B1 | 12/2001 | Boutaghou et al. | |
| 6,338,899 B1 | 1/2002 | Fukuzawa et al. | |
| 6,359,746 B1 | 3/2002 | Kakekado | |
| 6,366,416 B1 | 4/2002 | Meyer | |
| 6,377,422 B1 | 4/2002 | Boutaghou et al. | |
| 6,501,606 B2 | 12/2002 | Boutaghou | |
| 6,552,880 B1 | 4/2003 | Dunbar | |
| 6,577,466 B2 | 6/2003 | Meyer | |
| 6,594,104 B2 | 7/2003 | Tokuyama et al. | |
| 6,600,622 B1 | 7/2003 | Smith | |
| 6,603,619 B1 | 8/2003 | Kojima et al. | |
| 6,662,623 B2 | 12/2003 | Baumgartner | |
| 6,666,076 B2 | 12/2003 | Lin | |
| 6,671,133 B1 | 12/2003 | Sasaki et al. | |
| 6,692,848 B2 | 2/2004 | Ohtani | |
| 6,697,223 B2 | 2/2004 | Lewis | |
| 6,700,724 B2 | 3/2004 | Riddering | |
| 6,771,453 B2 | 8/2004 | Baumgartner | |
| 6,776,176 B1 | 8/2004 | Kino | |
| 6,785,081 B2 | 8/2004 | Chapin | |
| 6,788,500 B2 | 9/2004 | Baril et al. | |
| 6,899,456 B2 * | 5/2005 | Sundaram et al. | 374/4 |
| 6,958,871 B2 | 10/2005 | Hirano | |
| 6,967,805 B1 | 11/2005 | Hanchi et al. | |
| 7,006,336 B2 | 2/2006 | Coffey et al. | |
| 7,042,674 B1 | 5/2006 | Baril et al. | |
| 7,064,659 B2 | 6/2006 | Baumgartner | |
| 7,068,457 B2 | 6/2006 | Riddering | |
| 7,092,195 B1 | 8/2006 | Liu et al. | |
| 7,097,110 B2 | 8/2006 | Sheperek | |
| 7,099,096 B2 | 8/2006 | Ueyanagi | |
| 7,130,141 B2 | 10/2006 | Chey et al. | |
| 7,180,692 B1 | 2/2007 | Che | |
| 7,190,543 B2 | 3/2007 | Suk | |
| 7,194,802 B2 | 3/2007 | Fayeulle | |
| 7,199,960 B1 | 4/2007 | Schreck | |
| 7,233,451 B2 | 6/2007 | Baumgart | |
| 7,262,936 B2 | 8/2007 | Hamann et al. | |
| 7,265,922 B2 | 9/2007 | Biskeborn et al. | |
| 7,278,902 B1 | 10/2007 | Kurita | |
| 7,310,197 B2 | 12/2007 | Baumgart | |
| 7,310,198 B2 | 12/2007 | Baumgart | |
| 7,312,941 B2 | 12/2007 | Hirano | |
| 7,362,535 B2 | 4/2008 | Kumano | |
| 7,365,931 B2 | 4/2008 | Ikai | |
| 7,371,708 B2 | 5/2008 | Arai et al. | |
| 7,372,665 B1 | 5/2008 | Stoev et al. | |
| 7,411,752 B2 | 8/2008 | Angelo | |
| 7,417,820 B2 | 8/2008 | Otsuki et al. | |
| 7,450,333 B2 | 11/2008 | Hirano | |
| 7,477,470 B2 | 1/2009 | Leis et al. | |
| 7,502,205 B1 | 3/2009 | Hurtado et al. | |
| 7,508,612 B2 | 3/2009 | Biskeborn et al. | |
| 7,518,818 B2 | 4/2009 | Yamazaki et al. | |
| 7,561,368 B2 | 7/2009 | Kim et al. | |
| 7,564,649 B2 | 7/2009 | Hanchi et al. | |
| 7,593,187 B2 | 9/2009 | Aoki | |
| 7,595,960 B2 | 9/2009 | Shimizu et al. | |
| 7,616,398 B2 | 11/2009 | Gong | |
| 7,623,322 B2 | 11/2009 | Umehara et al. | |
| 7,626,144 B2 | 12/2009 | Merzliakov | |
| 7,649,714 B2 | 1/2010 | Kato et al. | |
| 7,692,888 B2 | 4/2010 | Duan | |
| 7,692,898 B2 | 4/2010 | Hattori | |
| 7,706,109 B2 | 4/2010 | Nichols et al. | |
| 7,724,480 B1 | 5/2010 | Guo | |
| 7,729,079 B1 | 6/2010 | Huber | |
| 7,729,087 B1 | 6/2010 | Stoev et al. | |
| 7,742,255 B2 | 6/2010 | Daugela | |
| 7,760,457 B1 | 7/2010 | Gunderson | |
| 7,773,346 B1 | 8/2010 | Guo | |
| 7,787,201 B2 | 8/2010 | Alex | |
| 7,787,207 B2 | 8/2010 | Takahashi | |
| 7,796,356 B1 | 9/2010 | Fowler et al. | |
| 7,800,858 B1 | 9/2010 | Bajikar et al. | |
| 7,804,657 B1 | 9/2010 | Hogg et al. | |
| 7,864,474 B2 | 1/2011 | Satoh et al. | |
| 7,872,824 B1 | 1/2011 | Macchioni et al. | |
| 7,903,365 B2 | 3/2011 | Watanabe | |
| 7,929,249 B2 | 4/2011 | Seigler | |
| 7,929,256 B2 | 4/2011 | Yamashita et al. | |
| 8,049,984 B2 | 11/2011 | Contreras | |
| 8,098,450 B2 | 1/2012 | Baumgart et al. | |
| 8,144,412 B2 | 3/2012 | Kiyono | |
| 8,149,541 B2 | 4/2012 | Baumgart | |
| 8,199,431 B2 | 6/2012 | Kanaya et al. | |
| 8,248,737 B2 | 8/2012 | Chen | |
| 8,279,557 B2 | 10/2012 | Kautzky | |
| 8,297,113 B2 | 10/2012 | Liners et al. | |
| 8,310,779 B2 | 11/2012 | Hanchi | |
| 8,335,053 B2 | 12/2012 | Chen | |
| 8,523,312 B2 | 9/2013 | Zheng et al. | |
| 8,737,009 B2 | 5/2014 | Kunkel et al. | |
| 8,804,263 B1 | 8/2014 | Contreras et al. | |
| 2002/0039264 A1 | 4/2002 | Ohsawa et al. | |
| 2002/0056313 A1 | 5/2002 | Wakefield | |
| 2002/0071196 A1 | 6/2002 | Chapin | |
| 2002/0071215 A1 | 6/2002 | Lewis | |
| 2002/0093753 A1 | 7/2002 | Atsumi | |
| 2002/0118485 A1 | 8/2002 | Tokuyama et al. | |
| 2003/0002183 A1 | 1/2003 | Fioravanti | |
| 2003/0043491 A1 | 3/2003 | Riddering | |
| 2003/0043497 A1 | 3/2003 | Riddering | |
| 2003/0051529 A1 | 3/2003 | Baumgartner | |
| 2003/0058559 A1 * | 3/2003 | Brand et al. | 360/31 |
| 2003/0086197 A1 | 5/2003 | Baumgartner | |
| 2003/0206361 A1 | 11/2003 | Baril et al. | |
| 2004/0027728 A1 | 2/2004 | Coffey et al. | |
| 2004/0085670 A1 | 5/2004 | Li et al. | |
| 2004/0190175 A1 | 9/2004 | Chey et al. | |
| 2004/0240109 A1 | 12/2004 | Hamann et al. | |
| 2005/0057833 A1 | 3/2005 | Hirano | |
| 2005/0057834 A1 | 3/2005 | Hirano | |
| 2005/0174665 A1 | 8/2005 | Zhang | |
| 2005/0176582 A1 | 8/2005 | Arai et al. | |
| 2005/0190496 A1 | 9/2005 | Hamann et al. | |
| 2006/0034013 A1 | 2/2006 | Kato et al. | |
| 2006/0119974 A1 | 6/2006 | Yamazaki et al. | |
| 2006/0285243 A1 | 12/2006 | Baumgart | |
| 2007/0019325 A1 | 1/2007 | Shimizu et al. | |
| 2007/0091512 A1 | 4/2007 | Nichols et al. | |
| 2007/0097536 A1 | 5/2007 | Biskeborn et al. | |
| 2007/0133118 A1 | 6/2007 | Kajitani | |
| 2007/0201154 A1 | 8/2007 | Ozeki | |
| 2007/0206654 A1 | 9/2007 | Merzliakov | |
| 2007/0242382 A1 | 10/2007 | Biskeborn et al. | |
| 2008/0080086 A1 | 4/2008 | Che | |
| 2008/0100965 A1 | 5/2008 | Oki | |
| 2008/0130152 A1 | 6/2008 | Kameyama | |
| 2008/0137225 A1 | 6/2008 | Duan | |

(56) References Cited

U.S. PATENT DOCUMENTS

| | | |
|---|---|---|
| 2008/0145709 A1 | 6/2008 | Yamashita et al. |
| 2008/0218909 A1 | 9/2008 | Kurihara |
| 2008/0225426 A1 | 9/2008 | Roy et al. |
| 2008/0225427 A1 | 9/2008 | Liu |
| 2008/0239581 A1 | 10/2008 | Ikai et al. |
| 2008/0247078 A1 | 10/2008 | Yao |
| 2008/0247079 A1 | 10/2008 | Satoh et al. |
| 2008/0247080 A1 | 10/2008 | Kim et al. |
| 2008/0259480 A1 | 10/2008 | Pham |
| 2008/0291579 A1 | 11/2008 | Uesugi et al. |
| 2009/0021867 A1 | 1/2009 | Kondo |
| 2009/0122435 A1 | 5/2009 | Takahashi |
| 2009/0153995 A1 | 6/2009 | Jang |
| 2009/0190260 A1 | 7/2009 | Kobatake |
| 2009/0262460 A1 | 10/2009 | Hanchi |
| 2010/0007976 A1 | 1/2010 | Baumgart |
| 2010/0020439 A1 | 1/2010 | Watanabe |
| 2010/0053815 A1 | 3/2010 | Komoriya |
| 2010/0097721 A1 | 4/2010 | Baumgart |
| 2010/0142096 A1 | 6/2010 | Contreras |
| 2010/0149696 A1 | 6/2010 | Chen |
| 2010/0157477 A1 | 6/2010 | Morinaga |
| 2010/0182723 A1 | 7/2010 | Yanagisawa |
| 2010/0232067 A1* | 9/2010 | Liners et al. ............ 360/234.3 |
| 2010/0284102 A1 | 11/2010 | Gubbins et al. |
| 2011/0032642 A1 | 2/2011 | Kautzky |
| 2011/0096440 A1 | 4/2011 | Greminger |
| 2011/0122533 A1 | 5/2011 | Kiyono |
| 2011/0157740 A1 | 6/2011 | Baumgart et al. |
| 2011/0235207 A1 | 9/2011 | Yang |
| 2011/0235208 A1 | 9/2011 | Yang |
| 2011/0249363 A1 | 10/2011 | Kanaya et al. |
| 2012/0099218 A1 | 4/2012 | Kurita |
| 2012/0105999 A1 | 5/2012 | Chen |
| 2012/0113207 A1 | 5/2012 | Zheng |
| 2012/0120519 A1 | 5/2012 | Kunkel et al. |
| 2012/0120521 A1 | 5/2012 | Kurita |
| 2012/0120522 A1 | 5/2012 | Johnson et al. |
| 2012/0120527 A1 | 5/2012 | Kunkel et al. |
| 2012/0120528 A1 | 5/2012 | Furukawa |
| 2012/0120982 A1 | 5/2012 | Anaya-Dufresne et al. |
| 2012/0201108 A1 | 8/2012 | Zheng et al. |
| 2013/0250446 A1 | 9/2013 | Zeng et al. |
| 2013/0250455 A1 | 9/2013 | Zeng et al. |
| 2013/0286802 A1 | 10/2013 | Kiely |
| 2013/0286805 A1 | 10/2013 | Macken et al. |
| 2014/0009851 A1 | 1/2014 | Budde |
| 2014/0023108 A1 | 1/2014 | Johnson et al. |
| 2014/0029402 A1 | 1/2014 | Zheng et al. |
| 2014/0269819 A1 | 9/2014 | Kiely et al. |
| 2014/0269838 A1 | 9/2014 | Macken |
| 2015/0062754 A1 | 3/2015 | Peng et al. |

FOREIGN PATENT DOCUMENTS

| | | |
|---|---|---|
| JP | O6168421 | 6/1994 |
| JP | 07114717 | 5/1995 |
| JP | 10049927 | 2/1998 |
| JP | 11339414 | 12/1999 |
| JP | 2003297029 | 10/2003 |
| JP | 2004335069 | 11/2004 |
| JP | 2007234093 | 9/2007 |
| JP | 2008097760 | 4/2008 |
| JP | 2008112545 | 5/2008 |
| JP | 2008186549 | 8/2008 |
| JP | 2009129532 | 6/2009 |
| KR | 1020110108181 | 10/2011 |
| WO | WO2012068399 | 5/2012 |

OTHER PUBLICATIONS

File History for U.S. Appl. No. 13/299,094.
File History for U.S. Appl. No. 12/941,461.
File History for U.S. Appl. No. 14/016,645.
File History for U.S. Appl. No. 14/287,419.
File History for U.S. Appl. No. 14/287,412.
File History for U.S. Appl. No. 14/457,678.
File History for U.S. Appl. No. 14/457,694.
File History for U.S. Appl. No. 13/298,712.
International Search Report and Written Opinion dated Feb. 28, 2012 for PCT Application No. PCT/US2011/061233, 12 pages.
International Search Report and Written Opinion dated Feb. 28, 2012 for PCT Application No. PCT/US2011/061236, 11 pages.
International Preliminary Report on Patentability dated May 30, 2013 for PCT Application No. PCT/US2011/061233, 8 pages.
International Preliminary Report on Patentability dated May 30, 2013 for PCT Application No. PCT/US2011/061236, 7 pages.
Kirchhoff's Voltage Law (KVL): Divider Circuits and Kirchhoff's Laws, http://www/ataboutcircuits.com/vol_1/chpt_6/2.html., retrieved from the internet on Jul. 14, 2014, 12 pages.
Schreck et al., "Thin Film Thermocouple Sensors for Measurement of Contact Temperatures During Slider Asperity Interaction on Magnetic Recording Disks", IEEE Transactions on Magnetics, vol. 28, No. 5, Sep. 1992, pp. 2548-2550.
Office action dated Jun. 19, 2015 for U.S. Appl. No. 14/720,299, 18 pages.
File History for U.S. Appl. No. 13/299,139.
Office Action dated Nov. 25, 2014 for JP Application No. 2013-136342, 4 pages.
European Search Report dated Mar. 4, 2013 for EP Application No. 12192502.8, 6 pages.
Office Action dated Nov. 4, 2014 for JP Application No. 2013-540023, 2 pages.
Korean Office Action with translation dated Jan. 20, 2014 for KR Application No. 10-2012-0130952, 11 pages.

* cited by examiner

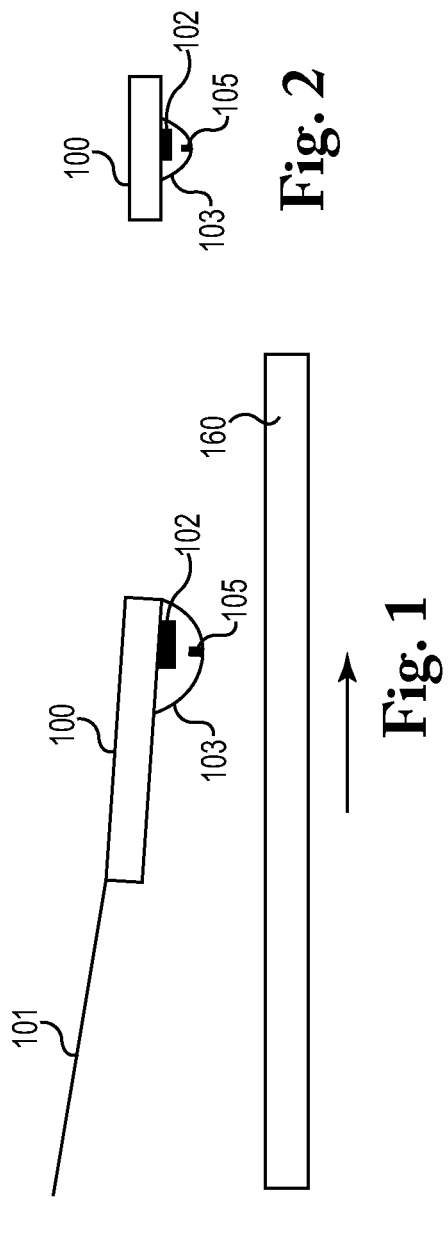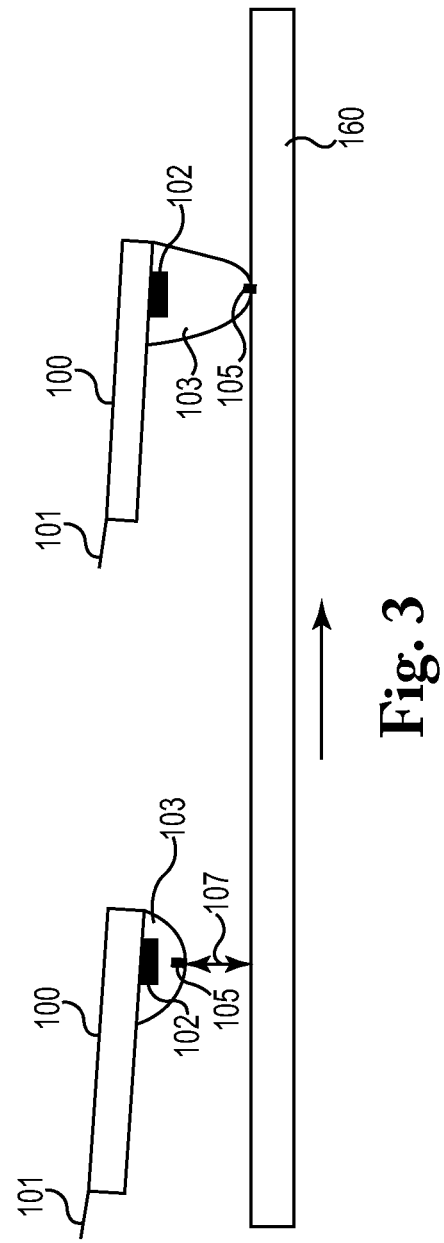

a) STATIC RESPONSE OF LARGE WIRE (10 um LONG) AS A FUNCTION OF HEATER POWER (5000 uA CORRESPONDS TO AN OHR OF ~0.1)

B) STATIC RESPONSE OF SHORT WIRE (0.5 um LONG) AS A FUNCTION OF HEATER POWER (1600 uA CORRESPONDS TO AN OHR OF ~0.2)

US 9,373,361 B2

ASPERITY AND HEAD-MEDIA CONTACT DETECTION USING MULTI-STAGE TEMPERATURE COEFFICIENT OF RESISTANCE SENSOR

RELATED PATENT DOCUMENTS

This application is a continuation of U.S. patent application Ser. No. 14/287,412, filed May 27, 2014, which is a continuation of U.S. patent application Ser. No. 13/299,082, filed Nov. 17, 2011, now U.S. Pat. No. 8,760,811, which claims the benefit of Provisional Patent Application Ser. Nos. 61/414,733 and 61/414,734 both filed on Nov. 17, 2010, which are hereby incorporated herein by reference in their entireties.

SUMMARY

Embodiments of the disclosure are directed to a temperature coefficient of resistance (TCR) sensor, and methods of using same, capable of sensing specified features of a magnetic recording medium, such as features of the magnetic recording medium having significantly different scale. Embodiments of the disclosure are directed to a TCR sensor, and methods of using same, having a multiplicity of sensor stages each configured to sense a different feature of a magnetic recording medium, such as relatively small-scale features (e.g., features having a small surface area that interact with the TCR sensor) and relatively large-scale features (e.g., features having a large surface area that interact with the TCR sensor).

An apparatus, according to various embodiments, includes a head transducer and a multi-stage sensor situated on the head transducer configured to interact with a magnetic recording medium. A first sensor stage of the multi-stage sensor has a temperature coefficient of resistance. A second sensor stage of the multi-stage sensor is coupled to the first sensor and has a temperature coefficient of resistance. The first sensor stage is configured to preferentially sense asperities of the media relative to the second sensor stage, and the second sensor stage configured to preferentially sense contact with a surface of the media relative to the first sensor stage. According to some embodiments, the second sensor stage is connected in series with the first sensor stage. In other embodiments, the second sensor stage is connected in parallel with the first sensor stage. In further embodiments, the first and second sensor stages can be operated independently, with each sensor stage having its own electrical connection pads.

Various embodiments are directed to a method involving use of a multi-stage TCR sensor situated on a head transducer. With the head transducer moving relative to a magnetic recording medium, the method involves preferentially sensing asperities of the medium using a first sensor stage of the multi-stage sensor relative to a second sensor stage of the multi-stage sensor, and preferentially sensing contact with a surface of the medium using the second sensor stage relative to the first sensor stage. The method may further involve generating an output signal from the multi-stage sensor indicative of one or both of sensing asperities by the first sensor stage and sensing proximity to, and contact with, the medium surface by the second sensor stage.

These and other features and aspects of various embodiments may be understood in view of the following detailed discussion and accompanying drawings.

BRIEF DESCRIPTION OF THE DRAWINGS

FIG. 1 is a simplified side view of a heater-actuated head transducer arrangement which incorporates a multi-stage TCR sensor in accordance with various embodiments;

FIG. 2 is a front view of the heater-actuated head transducer arrangement shown in FIG. 1;

FIG. 3 shows the heater-actuated head transducer arrangement of FIGS. 1 and 2 in a pre-actuated configuration and an actuated configuration;

DETAILED DESCRIPTION

Figure 4A:
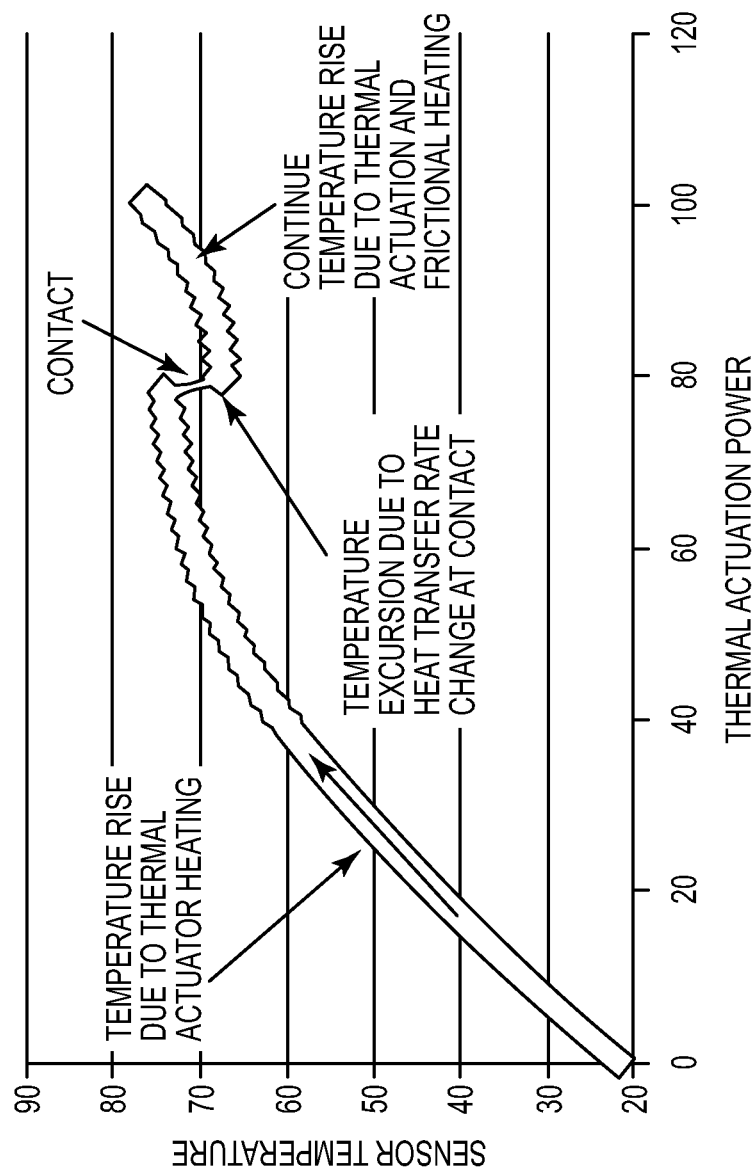
FIG. 4A illustrates a representative temperature profile for a heater-actuated recording head transducer of the type shown in FIGS. 1-3 before, during, and after contact between the head transducer and a surface of a magnetic recording disk.

Data storage systems commonly include one or more recording heads that read and write information to a recording medium. It is often desirable to have a relatively small distance or spacing between a recording head and its associated media. This distance or spacing is known as "fly height" or "head-to-media spacing." By reducing the head-to-media spacing, a recording head is typically better able to both write and read data to and from a medium. Reducing the head-to-media spacing also allows for surveying of recording medium topography, such as for detecting asperities and other features of the recording medium surface.

The ability to detect both head-to-media contact and head-to-asperity contact is complicated by the competing objectives of detecting contact of two surface structures that differ significantly in terms of scale. Head-to-media contact, for example, is a relatively large contact event involving a relatively large contact area. Head-to-asperity contact is a relatively small contact event involving a relatively small contact area. Conventional sensing approaches typically use a single sensor for sensing both types of contact events, resulting in a compromised sensing scheme that is sub-optimal for sensing both types of contact events.

In accordance with various embodiments, and with reference to FIGS. 1-3, a slider 100 is shown supported by a suspension 101 in close proximity to a rotating magnetic storage disk 160. The slider 100 supports a recording head transducer 103 and a heater 102 thermally coupled to the head transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the head transducer 103. This thermal expansion can be used to reduce the head-to-media spacing 107 in a data storage system. It is noted that, in some embodiments, a non-thermal actuator can be used to reduce the head-to-media spacing 107.

A multi-stage TCR sensor 105 is shown situated on the head transducer 103 at the close point to the magnetic recording medium 160. The close point is generally understood to be the closest point of contact between the head transducer 103 and the magnetic recording medium 160. As discussed previously, actuation of the head transducer 103 can be realized by a thermal actuator, such as the heater 102, or other actuator (e.g., a writer). Bias power is applied to the multi-stage TCR sensor 105 to raise the surface temperature of the sensor 105 and adjacent portion of the head transducer 103 to be substantially higher than the temperature of the magnetic recording disk 160.

The multi-stage TCR sensor 105 is preferably configured to sense changes in heat flow for detecting asperities of the medium 160 and head-to-media contact. Details concerning head-to-media spacing and contact determinations in accordance with various embodiments of the disclosure are provided in commonly owned U.S. patent application Ser. No. 12/941,461 filed Nov. 8, 2010 which is incorporated herein by reference.

As is depicted in FIG. 3, before head-to-media contact, there is an air gap 107 defined between the hot head surface and the relatively cool disk 160. The head transducer 103, air gap 107, and magnetic recording disk 160 define one level of heat transfer rate. When the head transducer 103 is in contact with the disk 160, such as after activation of the thermal actuator or heater 102, the direct contact between the high thermal conductivity materials of the head transducer 103 and the disk 160 significantly increases the heat transfer rate. As such, the TCR sensor 105 on the head transducer 103 senses a drop of temperature or an excursion of temperature trajectory, allowing for detection of head-to-media contact. As will be described in greater detail hereinbelow, the multi-stage TCR sensor 105 is preferably implemented to incorporate a multiplicity of sensor stages, each of which is sensitive to disk surface features of different scale. In particular, a multi-stage TCR sensor 105 incorporates a sensor stage configured to preferentially sense proximity to, and contact with, a surface of the magnetic recording disk 160, and a sensor stage configured to preferentially sense asperities of the disk 160.

FIG. 4A illustrates a representative temperature profile for a recording head transducer 103 of the type shown in FIGS. 1-3 before, during, and after contact between the head transducer 103 and a surface of the magnetic recording disk 160. In this illustrative example, the temperature profile is represented as a steady state DC signal. When the head transducer 103 is actuated by a thermal actuator 102, the head transducer surface temperature will increase with the actuation due to the heat generated by the thermal actuator 102. The head transducer temperature will be higher than the temperature of the disk 160. As such, the disk 160 acts as a heat sink in this scenario.

When the head transducer 103 contacts the disk 160, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-to-media contact.

Figure 4B:
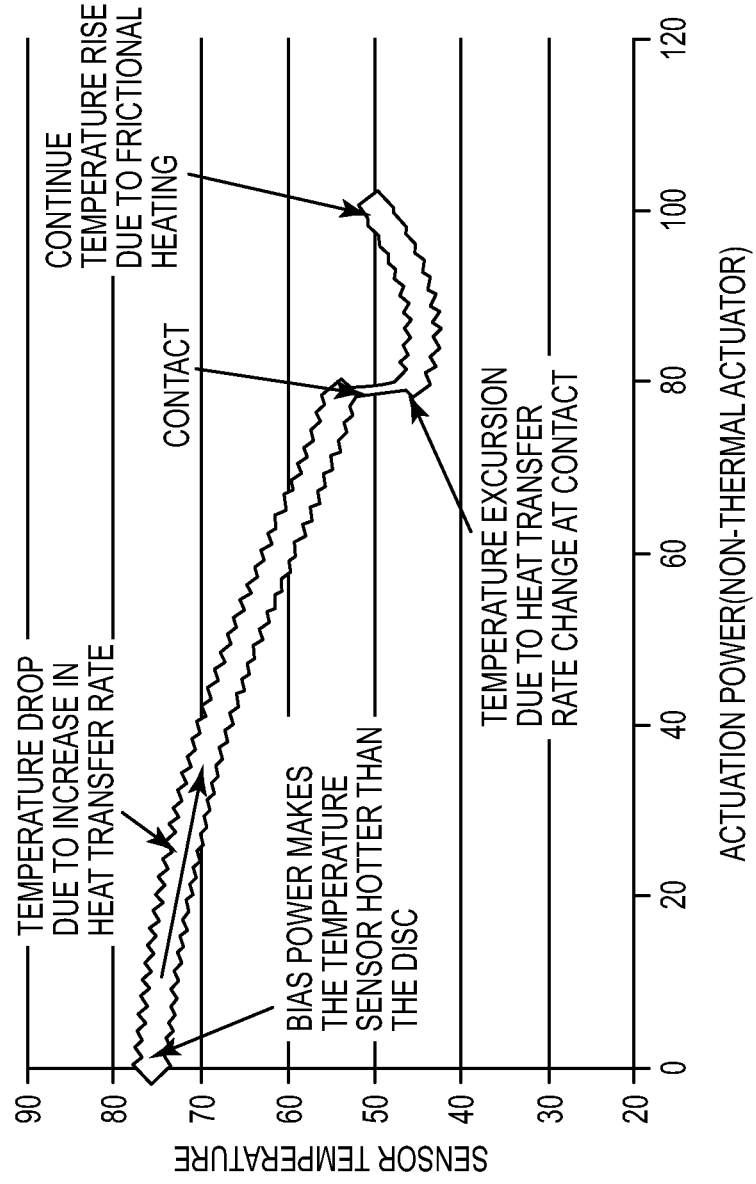
FIG. 4B illustrates a representative temperature profile for a non-thermal actuatable recording head transducer before, during, and after contact between the head transducer and a surface of a magnetic recording disk.

FIG. 4B illustrates a representative temperature profile for a recording head transducer 103 which is actuated by a non-thermal actuator. In this illustrative example, the TCR sensor 105 bias power self-heats the TCR sensor to a temperature substantially higher than the temperature of the disk 160. The disk 160 acts as a heat sink in this scenario. When the head transducer 103 is actuated down toward the disk 160, the heat transfer rate increases gradually, which causes a gradual temperature decrease in the TCR sensor temperature. When the head transducer 103 comes into contact with the disk 160, there will be a change in heat transfer rate, causing a head transducer surface temperature excursion. The TCR sensor 105 on the head transducer surface measures this temperature excursion to detect head-to-media contact. Should further actuation into head-to-media contact occur, the temperature will eventually increase due to frictional heating.

As discussed previously, head-to-media clearance is an important parameter that impacts magnetic disk recording performance. As the areal density increases, the head-to-media spacing decreases. As the head-to-media spacing decreases, the importance of accurately measuring head-to-media clearance, head-to-media contact, and head-to-asperity contact increases. A multi-stage TCR sensor according to embodiments of the disclosure can be used to measure head-to-media clearance, head-to-media contact, and head-to-asperity contact. According to various embodiments, a multi-stage TCR sensor incorporates a TCR resistive temperature sensor comprising a wire that monitors the temperature and change of temperature of the head transducer at the wire.

TCR wire sensors for asperity detection and contact detection have different optimization paths. As summarized in Table 1 below, TCR wires configured for asperity detection are typically designed to have hot (e.g., temperature of ~100° C. above the transducer temperature) and small sensors. In general, hot sensors provide a good SNR. Small sensors are able to determine the geometry of a small asperity for accurate track padding, for example.

TCR wires for head-to-media contact detection function better when they are larger and have more of their sensing area at the airbearing surface (ABS). This allows such TCR wires to capture the transfer of heat from the airbearing surface to the media. Larger TCR wires have also been shown to have an acceptable SNR at much lower temperatures (e.g., ~10° C.). As such, it is not feasible to optimize a single device for both asperity and contact detection.

TABLE 1

| Sensor direction of goodness | Asperity detection | Contact detection |
| --- | --- | --- |
| Cross track width | Smaller | Larger |
| Temperature | Hotter(~100° C.) | Can be run cooler (~10° C.) |

Figure 5:
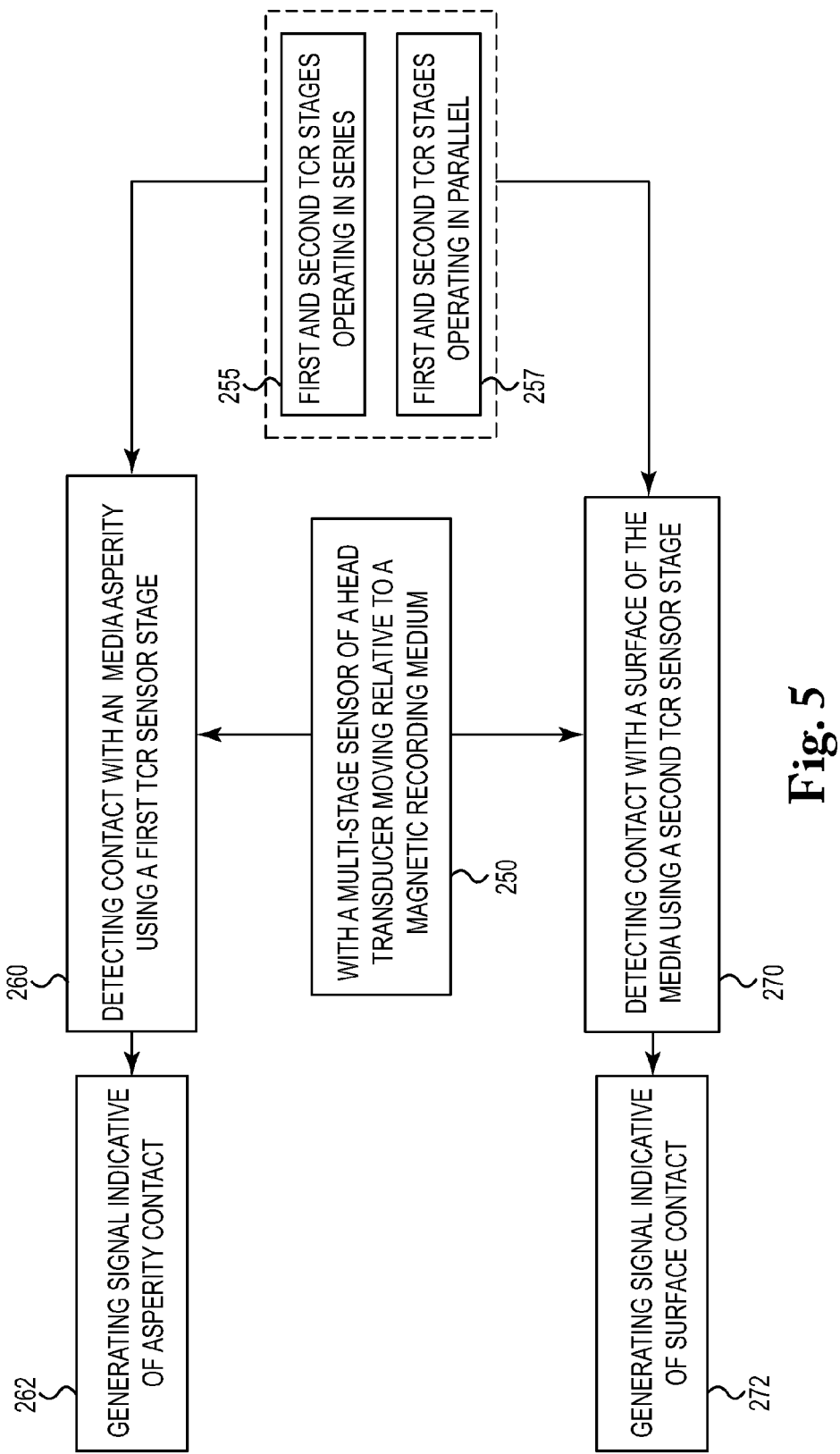
FIG. 5 is a flowchart showing various processes of a method for detecting specified surface features of, and contact with, a magnetic recording medium using a multi-stage TCR sensor in accordance with various embodiments.

Turning now to FIG. 5, there is illustrated a flowchart showing various processes of a method for detecting specified surface features of, and contact with, a magnetic recording medium using a multi-stage TCR sensor in accordance with various embodiments. With a multi-staged sensor of a head transducer moving 250 relative to a magnetic recording medium, contact with the media asperities detected 260 using a first TCR sensor stage of the multi-staged sensor. A signal indicative of contact between the first TCR sensor stage and the media asperity is generated 262. This signal can be communicated to an output of the multi-staged sensor.

As is further shown in FIG. 5, contact with the surface of the media is detected 270 using a second TCR sensor stage of the multi-staged sensor. A signal indicative of surface contact is generated 272, which may be communicated to an output of the multi-staged sensor. According to some embodiments, the first and second TCR stages are configured to operate 255 in a series mode, such as by alternately changing bias power supplied to the multi-staged sensor. In other embodiments, the first and second TCR stages are configured to operate 257 in a parallel mode, in which the first and second TCR stages may be operated alternately or concurrently.

Embodiments of the disclosure are directed to a multi-stage resistive temperature sensor comprising a TCR wire that has two elements. According to various embodiments, a TCR wire sensor includes a smaller hotter element for asperity detection and a larger, cooler element for contact detection. A dual-stage TCR wire sensor, for example, includes both a small hot element and a cooler large element. For purposes of highlighting particular features of a dual-stage TCR wire sensor according to various embodiments of the disclosure, reference will be made to FIG. 6, which shows a single-stage TCR wire sensor 301. As was discussed hereinabove, it is not feasible to implement a single-stage TCR wire sensor 301 that provides reliable detection of both asperity and media contact detection.

Figure 6:
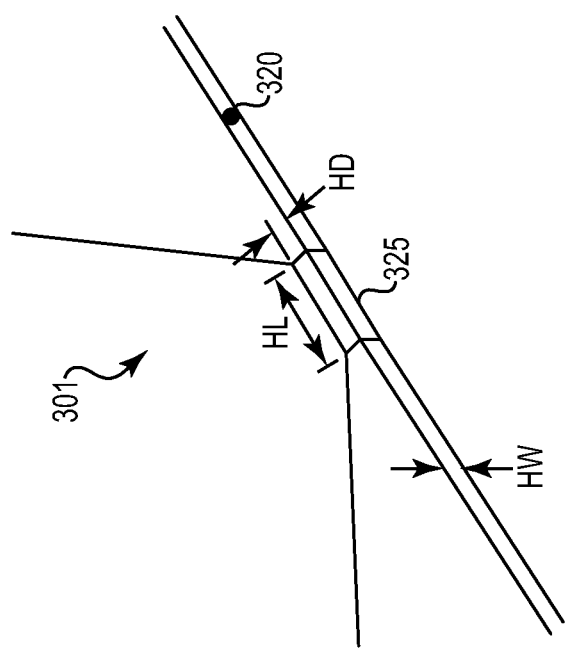
FIG. 6 shows a single-stage TCR wire sensor for illustrative purposes.

Although the single-stage sensor shown in FIG. 6 may have some limited amount of material at the airbearing surface, a dual-stage TCR sensor according to embodiments of the disclosure has much more of the material creating the resistance of the element located at the ABS, where the temperature gradient between the head transducer and disk is largest. Therefore, a larger change in resistance will be accompanied with ABS surface temperature changes as compared to a conventional design that has much more material located into the slider body, shielded from the ABS surface.

Figure 7:
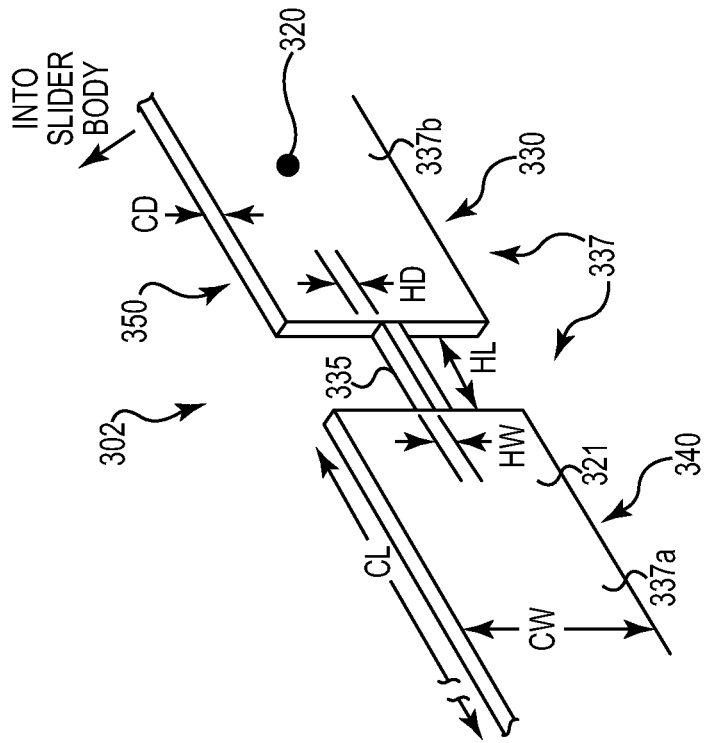
FIG. 7 shows a multi-stage TCR sensor with two different TCR sensor stages coupled in series in accordance with various embodiments.

FIG. 7 illustrates a dual-stage TCR sensor 302 which includes a first sensor stage 335 (e.g., a hot TCR wire sensor) and a second sensor stage 337 (e.g., a cold TCR wire sensor). The terms hot and cold associated with the first and second sensor stages 335 and 337 are used herein for purposes of explanation, in view of the significantly different temperatures at which these two sensor stages typically operate (e.g., ~100° C. and ~10° C., respectively). The first sensor stage 335 is sensitive to changes in heat flow across a small sensing area relative to that of the second sensor stage 337. Accordingly, the first sensor stage 335 has greater sensitivity to changes in heat flow for detecting asperities of the magnetic recording medium. The second sensor stage 337 is sensitive to changes in heat flow across a large sensing area relative to that of the first sensor stage 335. As such, the second sensor stage 337 has greater sensitivity to changes in heat flow for detecting contact and spacing between the head transducer and the surface of the magnetic recording medium.

In the embodiment shown in FIG. 7, the first and second sensor stages 335 and 337 define a unitary sensing structure. The second sensor stage 337 includes second sensor stage portions 337a and 337b, and the first sensor stage 335 is situated between the second sensor portions 337a and 337b. In this configuration, the first and the second sensor stages 335 and 337 are coupled in series. The first sensor stage 335 is configured to preferentially sense asperities of a magnetic recording medium, and the second sensor stage 337 is configured to preferentially sense proximity to, and contact with, a surface of the magnetic recording medium. In other embodiments, the second sensor stage 337 includes two spaced-apart portions 337a and 337b that are situated at spaced-apart locations on the airbearing surface. In such embodiments, the two spaced-apart portions 337a and 337b can be used to concurrently measure contact with at least two spaced-apart locations of the surface of the medium.

According to some embodiments, when the dual-stage TCR sensor 302 is run in an asperity detection mode, a relatively large bias current can be used to significantly heat up the first sensor stage 335 to a temperature above ambient (i.e., above the disk temperature). Because asperity detection requires a hotter sensing element in comparison to media surface contact detection, a signal resulting from contact between the dual-stage TCR sensor 302 and an asperity will only be detected when the asperity interacts with the smaller hot first sensor stage 335. Therefore, the size of the asperity can be determined more accurately by measuring the cross-track distance of the signal than when using a much larger sensor. When the dual-stage TCR sensor 302 makes contact with a surface of the magnetic recording medium, the signal output by the dual-stage TCR sensor 302 is a combined signal produced by both the small hot first sensor stage 335 and the much larger cooler second sensor stage 337 that interacts with a significantly larger portion of the disk surface, thus resulting in a larger signal due to the larger area heat transfer/influence.

Figures 8A, 8B:
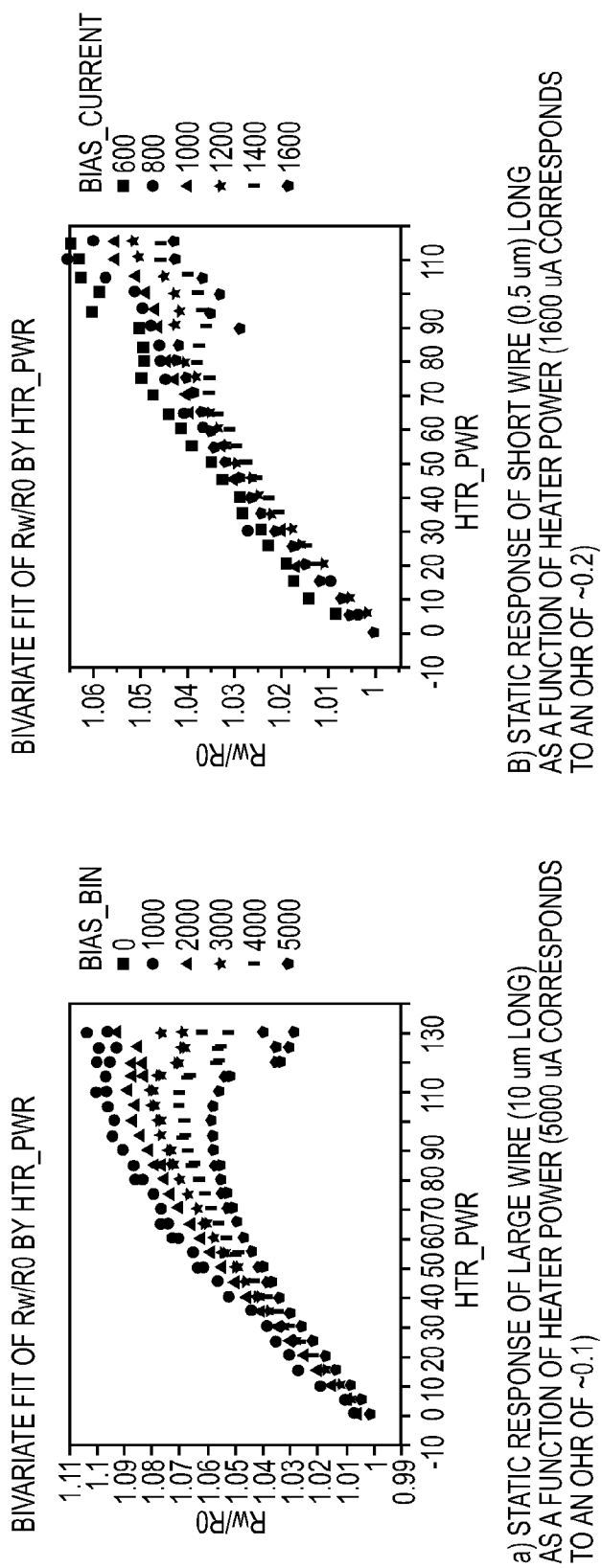
FIG. 8A shows the static response of a large TCR wire sensor as a function of heater power.
FIG. 8B shows the static response of a short TCR wire sensor as a function of heater power.
Figure 9:
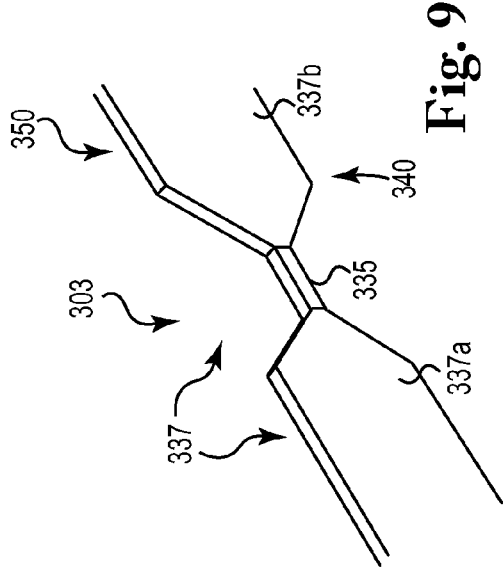
FIGS. 9-12 show several configurations of a multi-stage TCR sensor with two different TCR sensor stages coupled in series in accordance with various embodiments.
Figure 10:
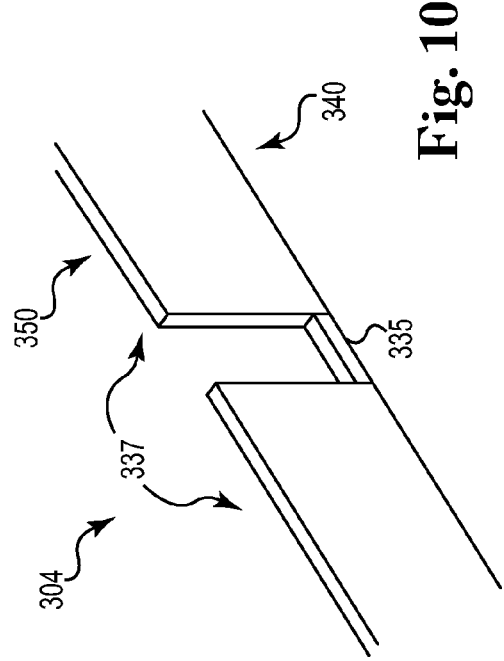

FIGS. 8A and 8B show an illustrative example of such an effect. FIG. 8A shows the static response of a large wire (~10 µm long) as a function of heater element power (5,000 µA corresponding to an overheat ratio (OHR) of ~0.1). FIG. 8B shows the static response of a short wire (~0.5 µm long) as a function of heater element power (1,600 µA corresponding to an OHR of ~0.2). The plots of data in FIGS. 8A and 8B show that the larger wire of FIG. 8A has a larger response with clearance at a lower temperature than the smaller wire of FIG. 8B. It is noted that R0 is calculated for each bias at zero heater power. Additional details concerning wire lengths, heater element power, and corresponding overheat ratios are provided in commonly owned U.S. patent application Ser. No. 13/298,712, filed Nov. 17, 2011, and U.S. Provisional Application Ser. No. 61/414,733 filed on Nov. 17, 2010, each of which is incorporated herein by reference.

With continued reference to FIG. 7, the first (hot) sensor stage 335 has a cross-track length (HL-hot length), an into slider body depth (HD-hot depth), and a down track width (HW-hot width). According to some embodiments, the first stage sensor 335 may have the following geometry: HL=750 nm; HD=75 nm; and HW=60 nm. Unlike a single-stage TCR wire sensor, such as that shown in FIG. 6, the dual-stage TCR sensor 302 shown in FIG. 7 includes a significant amount of TCR material (e.g., a majority of the material) at the airbearing surface (ABS) to define a cooler second (cold) sensor stage 337.

According to some embodiments, the second sensor stage 337 may have a cross-track length (CL-cold length) of about 15 µm, a down track width (CW-cold width) of about 1 µm, and an into slider body depth (CD-cold depth) of about 75 nm. It is noted that, although the respective cross-track length and the down track width of the first and second sensor stages 335 and 337 differ significantly (e.g., by a factor of about 20 and 17, respectively), the into slider body depth (HD and CD) of each of the first and second sensor stages 335 and 337 can be the same. It is understood that the into slider body depths, HD and CD, of the first and second sensor stages 335 and 337 can be different.

According to various embodiments, the temperature of the hot first sensor stage 335 can be controlled by changing the bias power of the sensor system (i.e., current, power, or voltage). The relative amount of heat generated at the hot first sensor stage 335 compared to the heat generated at the cooler second sensor stage 337 can be controlled by the geometry of the two sensor stages 335 and 337. That is, CL, CW, and CD can be tuned to provide the desired relative sensitivity between the hot and cold sensor stages 335 and 337. For example, holding all other dimensions fixed, as CW approaches HW, the temperature of the cold second sensor stage 337 will approach that of the hot first sensor stage 335. The exact dimensions can be determined and selected (e.g., optimized) based on the desired asperity and contact detection signal-to-noise ratio (SNR).

The multi-stage TCR sensor 302 includes a leading edge 340 and a trailing edge 350. Each of the first and second sensor stages 335 and 337 has a respective leading edge and trailing edge that are aligned co-parallel with the leading and trailing edges 340 and 350 of the multi-stage TCR sensor 302. In the embodiment shown in FIG. 7, the leading edge of the first sensor stage 335 is recessed relative to the leading edge of the second sensor stage 337. The relative alignment and positioning of the respective first and second sensor stages 335 and 337, and the geometry of these sensor stages 335 and 337, may be varied to achieve specified asperity and media contact detection performance characteristics.

FIGS. 9-12 show different configurations of a series multi-stage TCR sensor in accordance with various embodiments of the disclosure. The multi-stage TCR sensor 303 shown in FIG. 9, for example, includes a cold second sensor stage 337 having two second sensor stage portions 337a and 337b with opposing tapered edges contacting opposing ends of a hot first sensor stage 335. In the embodiment shown in FIG. 10, a hot first sensor stage 335 is situated between two rectangular second sensor stage portions 337a and 337b, with the surface of the first sensor stage 335 arranged co-planner with the leading edge 340 of the multi-stage TCR sensor 304.

Figure 11:
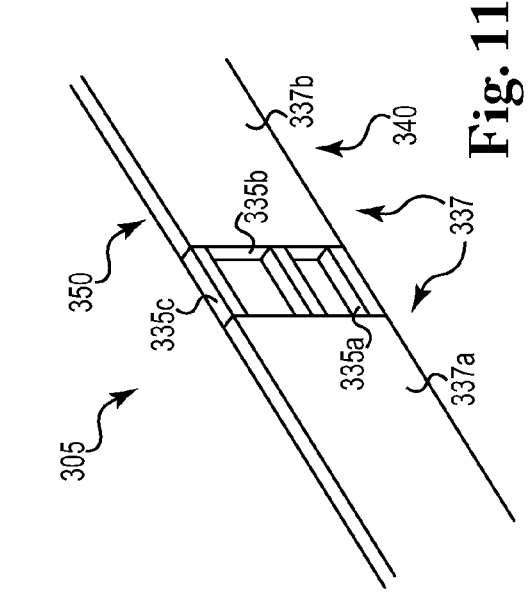
Figure 12:
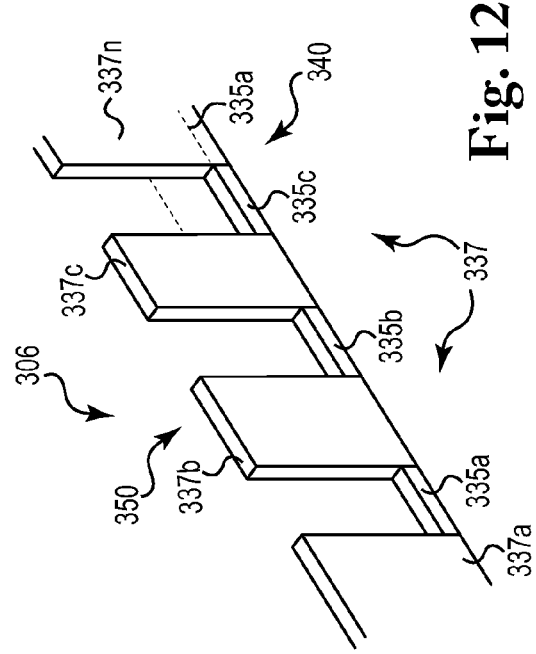

According to the embodiment shown in FIG. 11, a multiplicity of hot first sensor stage elements 335a, 335b, and 335c are situated between two rectangular second sensor stage portions 337a and 337b, with a surface of two of the first sensor stage elements 335a and 335c respectively arranged co-planner with the leading and trailing edges 340 and 350 of the multi-stage TCR sensor 305. In the embodiment of a multi-stage TCR sensor 306 shown in FIG. 12, the first sensor stage 335 includes a multiplicity of first sensor stage portions 335a-335n, and the second stage sensor 337 includes a multiplicity of second sensor stage portions 337a-337n. In the configuration shown in FIG. 12, one first sensor stage portion (e.g., 335b) is situated between a pair of adjacent spaced-apart second stage portions (e.g., 337b and 337c). A surface of each of the first sensor stage portions 335a-335n is arranged co-planar with the leading edge 340 of the multi-stage TCR sensor 306. Other configurations and arrangements of first and second sensor stages and sensor stage portions are contemplated. As discussed previously, the specific arrangement and dimensions of the individual sensor element geometries can be defined from asperity and contact detection SNR optimization algorithms.

In accordance with various embodiments of the disclosure, a multi-stage TCR sensor can be implemented to include a multiplicity of TCR sensors coupled in parallel, with each TCR sensor configured to sense different features of a magnetic recording medium and/or different forms of interaction between the surface of the magnetic recording medium and the multi-stage TCR sensor. A multi-stage TCR sensor according to such embodiments includes a first TCR sensor stage configured for sensing head-to-asperity contact and a second TCR sensor stage configured for sensing head-to-media contact, with the first and second TCR sensor stages coupled in parallel. Implementations of a multi-stage TCR sensor which incorporates parallel connected asperity and contact TCR sensors provide for improved (e.g., optimized) geometry and electrical connections, and account for design compromises that harmonize competing objectives of head-to-asperity contact and head-to-media contact detection.

Figure 13:
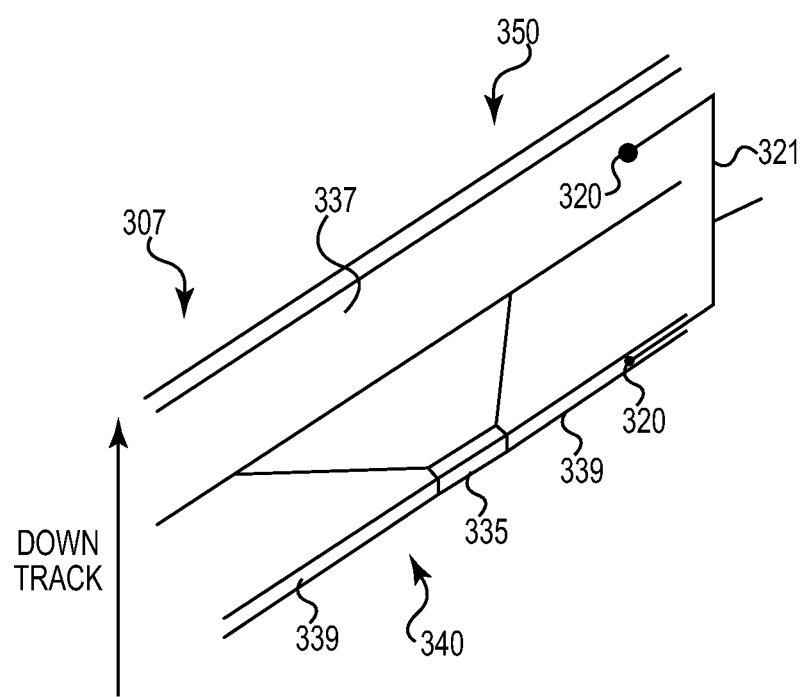
FIG. 13 shows a multi-stage TCR sensor with two different TCR sensor stages coupled in parallel in accordance with various embodiments.

FIG. 13 is an illustration of a multi-stage TCR sensor which incorporates parallel connected asperity and media contact TCR sensors in accordance with various embodiments. According to the embodiment shown in FIG. 13 the multi-stage TCR sensor 307 has a leading edge 340 and a trailing edge 350. The multi-stage TCR sensor 307 includes a hot first sensor stage 335 having a surface that is arranged co-parallel with the airbearing surface 320. As discussed previously, the first sensor stage 335 is configured to be preferentially sensitive to media surface features of relatively small scale, such as asperities. The multi-stage TCR sensor 307 further includes a cold second sensor stage 337 having a surface that is arranged co-parallel with the airbearing surface 320. The second sensor stage 337, also as discussed previously, is configured to be preferentially sensitive to media surface contact (i.e., media surface features of relatively large-scale).

Figure 14:
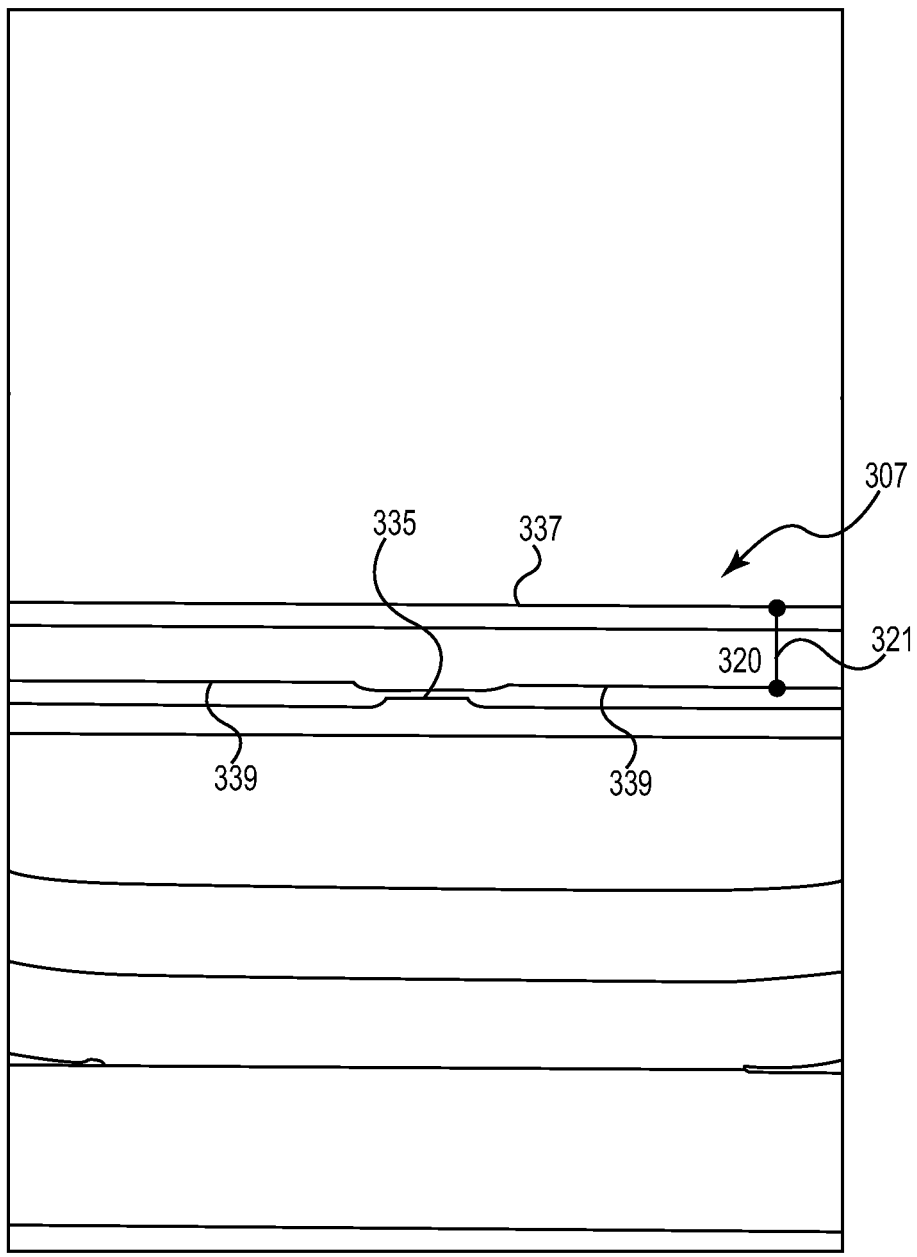
FIG. 14 is an airbearing surface view of the parallel multi-stage TCR sensor arrangement shown in FIG. 13.

The first and second sensor stages 335 and 337 shown in FIG. 13 are electrically coupled in parallel, which is depicted by the representative wire connection 321. FIG. 14 is an airbearing surface view of the parallel multi-stage TCR sensor arrangement 307 shown in FIG. 13.

As has been described previously, the cold second sensor stage 337 configured for head-to-media contact detection requires a relatively large area. As the heater actuated transducer head moves closer to the media, there is a small flow of thermal energy from the contact detection sensor stage 337 to the media. At contact, the thermal transfer increases greatly, resulting in a lower temperature of the contact detection sensor stage 337 and a subsequent resistance change.

The hot first sensor stage 335 configured for head-to-asperity contact detection requires a small area relative to that of the contact detection sensor stage 337. The asperity interacts directly with the asperity detection sensor stage 335 causing this sensor to increase or decrease in temperature and resulting in a subsequent resistance change. The temperature increases if the asperity has been pre-heated by rubbing on the upstream airbearing surface 320. The temperature decreases if the relatively colder asperity has had minimal contact with the transducer head before interacting with the asperity detection sensor stage 335.

For purposes of illustration, and not of limitation, it is assumed that the response of the parallel multi-stage TCR sensor 307 shown in FIGS. 13 and 14 is proportional to the change in resistance. In addition, it is assumed that the resistances are at operating conditions. The resistance, R, for each of the first sensor stage 335 ($R_{AD}$) and second sensor stage 337 ($R_{CD}$) increases with increased current.

For a multi-stage TCR sensor wired in series, such as the TCR sensors 302-306 shown in FIG. 7, and 9-12:

$$R_0 = R_{CD} + R_{AD}$$

where $R_0$ is the initial resistance, $R_{CD}$ is the contact detection sensor stage resistance, and $R_{AD}$ is the asperity detection sensor stage resistance. For a multi-stage TCR sensor wired in parallel, such as the TCR sensor 307 shown in FIGS. 13 and 14:

$$\frac{1}{R_0} = \frac{1}{R_{CD}} + \frac{1}{R_{AD}}$$

$$R_0 = \frac{R_{CD} R_{AD}}{R_{CD} + R_{AD}}$$

For asperity detection, the transducer head is kept at constant clearance. Consequently, there will not be any additional heater-induced thermal changes in the two sensor stages. It is assumed that the interaction with the asperity only affects the resistance of the asperity detection sensor stage. As such, the change in detected resistance becomes:
Wired in series:

$$R_1 = R_{CD} + (R_{AD} + \Delta R)$$

and the percentage change in resistance is given by:

$$\frac{R_1 - R_0}{R_0} = \frac{(R_{CD} + R_{AD} + \Delta R) - (R_{CD} + R_{AD})}{R_{CD} + R_{AD}} = \frac{\Delta R}{R_{CD} + R_{AD}}$$

Wired in parallel:

$$R_1 = \frac{R_{CD}(R_{AD} + \Delta R)}{R_{CD} + R_{AD} + \Delta R}$$

$$\frac{R_1 - R_0}{R_0} = \frac{\frac{R_{CD}(R_{AD} + \Delta R)}{R_{CD} + R_{AD} + \Delta R} - \frac{R_{CD} R_{AD}}{R_{CD} + R_{AD}}}{\frac{R_{CD} R_{AD}}{R_{CD} + R_{AD}}} = \frac{R_{CD} \Delta R}{R_{AD}(R_{CD} + R_{AD} + \Delta R)}$$

For small changes in resistance, the response for a multi-stage TCR sensor wired in parallel is $R_{CD}/R_{AD}$ times the response for the TCR sensor stages wired in series. Consequently, if $R_{CD} > R_{AD}$, the response for asperity detection will be greater for the TCR sensor stages wired in parallel.

Figure 15:
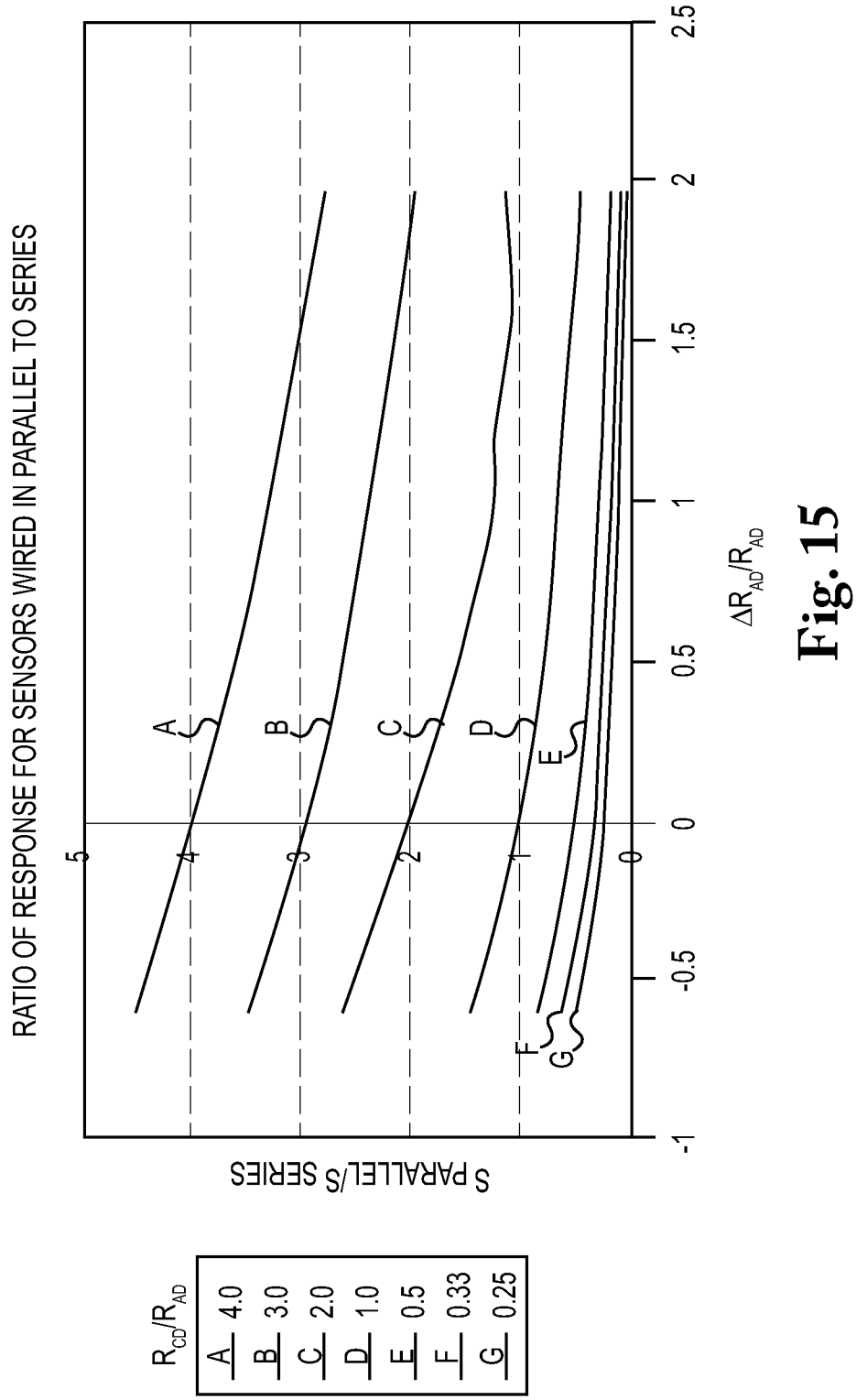
FIG. 15 is a graph of the relative response of two TCR sensor stages wired in parallel to two TCR sensor stages wired in series as a function of the change of resistance in accordance with various embodiments.

FIG. 15 is a graph of the relative response of the two TCR sensor stages wired in parallel to the two TCR sensor stages wired in series as a function of the change of resistance. FIG. 15 shows how the ratio of the parallel-to-series TCR sensor signal behaves as a function of the change in resistance for the asperity detection sensor stage. The graph of FIG. 15 shows that, for small changes in resistance due asperity detection, the relative response for the parallel TCR sensor circuit is greater than the response for the series TCR sensor circuit when $R_{CD} > R_{AD}$.

As the resistance change increases, the response in the parallel TCR sensor circuit reduces relative to that of the series TCR sensor circuit. FIG. 15 also shows that the asperity can cool the asperity detection sensor stage, resulting in a lower resistance. In the case of a cooling asperity, wiring the two sensor stages in parallel has an even greater benefit.

For contact detection, the transducer head is pushed closer to the media using the thermal actuator, or other actuator device, until head-to-media contact is detected. With a thermal actuator, the resistances of both TCR sensor stages is gradually increasing. For purposes of simplicity, only the change in resistance immediately before and at contact is considered. Consequently, complications due to the thermal actuator are ignored.

For contact detection, both TCR sensor stages experience the change in thermal load. To first order, both TCR sensor stages will have the same proportional response, $\beta$. It is noted that, because the relatively cool media reduces the temperature of the TCR sensor stages, $\beta$ is negative.

In the case of the two TCR sensor stages wired in series:

$$R_1 = R_{CD}(1+\beta) + R_{AD}(1+\beta)$$

and the percentage change in resistance is given by:

$$\frac{R_1 - R_0}{R_0} = \frac{(R_{CD} + R_{AD})(1 + \beta) - (R_{CD} + R_{AD})}{R_{CD} + R_{AD}} = \beta$$

In the case of the two sensor stages wired in parallel:

$$R_1 = \frac{R_{CD} R_{AD}(1 + \beta)}{R_{CD} + R_{AD}}$$

$$\frac{R_1 - R_0}{R_0} = \frac{\frac{R_{CD} R_{AD}(1 + \beta)}{R_{CD} + R_{AD}} - \frac{R_{CD} R_{AD}}{R_{CD} + R_{AD}}}{\frac{R_{CD} R_{AD}}{R_{CD} + R_{AD}}} = \beta$$

Consequently, the contact detection response for a multi-stage TCR sensor is the same for the two sensor stages wired in series or parallel. According to various embodiments, the resistance of the contact detection sensor stage ($R_{CD}$) may be in the range of about 1.5 to 4 times greater than the resistance of the asperity detection sensor stage ($R_{AD}$).

In addition to the various series and parallel multi-stage TCR sensor embodiments described hereinabove, other multi-stage TCR sensor configurations are contemplated. According to some embodiments, for example, a multi-stage TCR sensor may be implemented to include a hot first sensor stage and a cold second sensor stage, with each of the first and second sensor stages having its own electrical connection pads and operating independently.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. An apparatus, comprising:
   a slider supporting a read/write transducer configured to interact with a magnetic recording medium, the slider comprising an airbearing surface; and
   a multi-element sensor situated on the transducer at or near the airbearing surface, the multi-element sensor comprising at least three sensor elements each having a temperature coefficient of resistance;
   wherein at least two of the at least three sensor elements are arranged in a co-parallel relationship on the transducer and configured to sense for asperities of the medium, contact between the slider and the medium, slider-medium spacing changes, or topographical surface features of the medium, and one of the at least three sensor elements is configured as a dual-stage sensor comprising a first sensor stage configured to sense asperities of the medium and a second sensor stage configured to sense for contact and spacing changes between the slider and the medium.

2. The apparatus of claim 1, wherein:
   each of the at least three sensor elements has a length, a width, and a depth; and at least one of the length, the width, and the depth is about 10 μm.

3. The apparatus of claim 1, wherein each of the at least three sensor elements is situated at a close point of the transducer.

4. The apparatus of claim 1, wherein the at least three sensor elements are coupled in series.

5. The apparatus of claim 1, wherein at least some of the at least three sensor elements are coupled in parallel.

6. The apparatus of claim 1, wherein the at least three sensor elements are configured to sense for asperities of the medium.

7. The apparatus of claim 1, wherein the at least three sensor elements are configured to sense for contact between the slider and the medium.

8. The apparatus of claim 1, wherein the at least three sensor elements are configured to sense for topographical surface features of the medium.

9. The apparatus of claim 1, further comprising a detector coupled to the multi-element sensor and configured to detect the asperities of the medium, contact between the slider and the medium, and the slider-medium spacing changes.

10. An apparatus, comprising:
a slider supporting a read/write transducer configured to interact with a magnetic recording medium, the slider comprising an airbearing surface; and
a multi-element sensor situated on the transducer at or near the airbearing surface, the multi-element sensor comprising at least three sensor elements each having a temperature coefficient of resistance;
wherein at least two of the at least three sensor elements are arranged in a co-parallel relationship on the transducer, and one of the at least three sensor elements is configured as a dual-stage sensor comprising a first sensor stage configured to sense asperities of the medium and a second sensor stage configured to sense for contact and spacing changes between the slider and the medium.

11. The apparatus of claim 10, wherein:
each of the at least three sensor elements has a length, a width, and a depth; and
at least one of the length, the width, and the depth is about 10 μm.

12. The apparatus of claim 10, wherein each of the at least three sensor elements is situated at a close point of the transducer.

13. The apparatus of claim 10, further comprising a detector coupled to the multi-element sensor and configured to detect the asperities of the medium, contact between the slider and the medium, and the spacing changes.

14. An apparatus, comprising:
a slider supporting a read/write transducer configured to interact with a magnetic recording medium, the slider comprising an airbearing surface; and
a multi-element sensor situated on the transducer at or near the airbearing surface, the multi-element sensor comprising at least three sensor elements each having a temperature coefficient of resistance;
wherein the at least three sensor elements are configured to sense for asperities of the medium, contact between the slider and the medium, slider-medium spacing changes, or topographical surface features of the medium, and one of the at least three sensor elements is configured as a dual-stage sensor comprising a first sensor stage configured to sense asperities of the medium and a second sensor stage configured to sense for contact and spacing changes between the slider and the medium.

15. The apparatus of claim 14, wherein:
each of the at least three sensor elements has a length, a width, and a depth; and
at least one of the length, the width, and the depth is about 10 μm.

16. The apparatus of claim 14, wherein each of the at least three sensor elements is situated at a close point of the transducer.

17. The apparatus of claim 14, further comprising a detector coupled to the multi-element sensor and configured to detect the asperities of the medium, contact between the slider and the medium, the slider-medium spacing changes, and the topographical surface features of the medium.

* * * * *